(12) United States Patent
Le Magoarou et al.

(10) Patent No.: US 11,374,799 B2
(45) Date of Patent: Jun. 28, 2022

(54) METHOD FOR ESTIMATING A WIRELESS COMMUNICATION CHANNEL, DEVICE FOR ESTIMATING A WIRELESS COMMUNICATION CHANNEL AND COMPUTER PROGRAM THEREFOR

(71) Applicant: FONDATION B-COM, Cesson Sevigne (FR)

(72) Inventors: Luc Le Magoarou, Rennes (FR); Antoine Le Calvez, Lannion (FR); Stéphane Paquelet, Rennes (FR)

(73) Assignee: FONDATION B-COM, Cesson Sevigne (FR)

( * ) Notice: Subject to any disclaimer, the term of this patent is extended or adjusted under 35 U.S.C. 154(b) by 0 days.

(21) Appl. No.: 17/288,224

(22) PCT Filed: Oct. 9, 2019

(86) PCT No.: PCT/EP2019/077298
§ 371 (c)(1),
(2) Date: Apr. 23, 2021

(87) PCT Pub. No.: WO2020/083641
PCT Pub. Date: Apr. 30, 2020

(65) Prior Publication Data
US 2022/0006674 A1 Jan. 6, 2022

(30) Foreign Application Priority Data
Oct. 26, 2018 (FR) ........................................ 1859952

(51) Int. Cl.
*H04B 7/0413* (2017.01)
*H04L 25/02* (2006.01)

(52) U.S. Cl.
CPC ....... *H04L 25/0242* (2013.01); *H04B 7/0413* (2013.01)

(58) Field of Classification Search
CPC .............. H04B 7/0413; H04L 25/0204; H04L 25/0242
See application file for complete search history.

(56) References Cited

U.S. PATENT DOCUMENTS

2013/0229303 A1* 9/2013 Marshall ................... G01S 5/12
342/357.29

OTHER PUBLICATIONS

International Search Report dated Dec. 4, 2019 for corresponding International Application No. PCT/EP2019/077298, Oct. 9, 2019.

(Continued)

*Primary Examiner* — Rahel Guarino
(74) *Attorney, Agent, or Firm* — David D. Brush; Westman, Champlin & Koehler, P.A.

(57) ABSTRACT

A method for estimating a wireless communication channel between a transmitter and a receiver, including a plurality of paths for propagation of a wave, at least one of the transmitter and the receiver being formed of a plurality of antennas. The method includes: for at least one path, determining a characteristic matrix, which depends on a first element representative of at least one propagation direction associated with the path, and a second element representative of a propagation distance associated with the path; and estimating the communication channel from the at least one obtained characteristic matrix.

9 Claims, 9 Drawing Sheets

(56) References Cited

OTHER PUBLICATIONS

Written Opinion of the International Searching Authority dated Dec. 4, 2019 for corresponding International Application No. PCT/EP2019/077298, filed Oct. 9, 2019.

English translation of the Written Opinion of the International Searching Authority dated Dec. 16, 2019 for corresponding International Application No. PCT/EP2019/077298, filed Oct. 9, 2019.

Luc Le Magoarou et al, "Bias-variance tradeoff in MIMO channel estimation", arxiv.org, Cornell University Library, 201 Online Library Cornell University Ithaca, NY 14853, Apr. 26, 2018 (Apr. 26, 2018), XP081228195.

Zhou Zhou et al, "Spherical Wave Channel and Analysis for Large Linear Array in LoS Conditions", 2015 IEEE Globecom Workshops (GC Wkshps), IEEE, Dec. 6, 2015 (Dec. 6, 2015), p. 1-6, XP032871031.

Cheng Xudong et al, "Geometrical Model for Massive MIMO Systems", 2017 IEEE 85th Vehicular Technology Conference (VTC Spring), IEEE, Jun. 4, 2017 (Jun. 4, 2017), p. 1-6, XP033254316.

\* cited by examiner

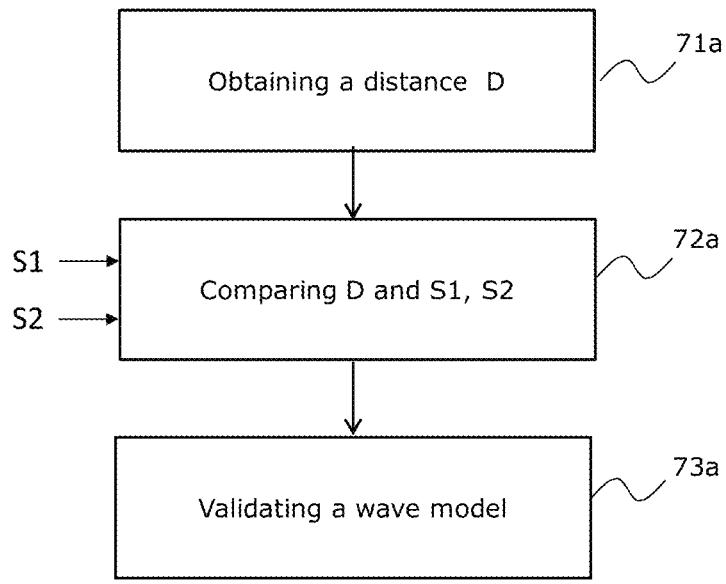
FIG. 7a
FIG. 7b
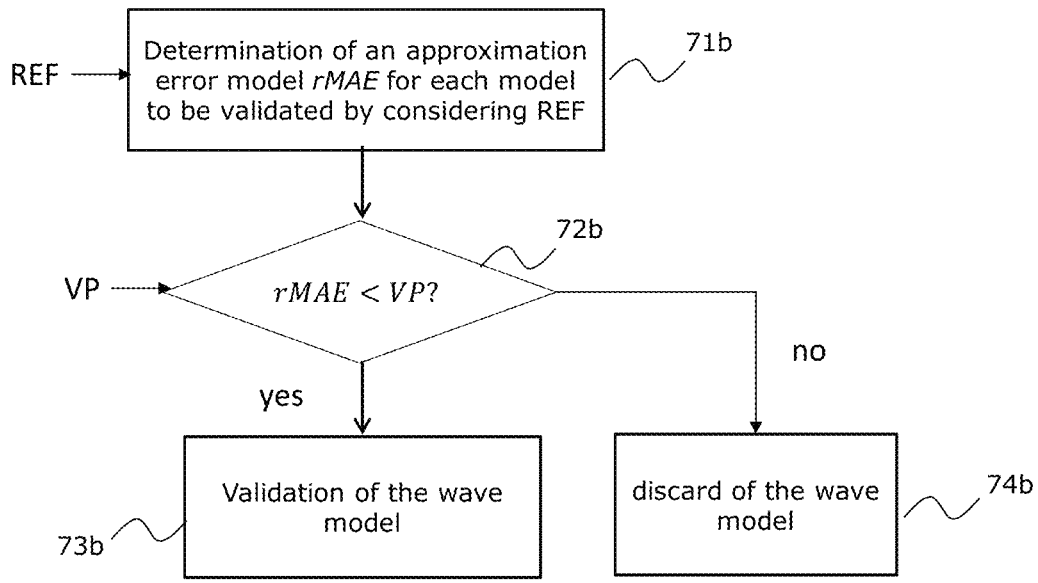

METHOD FOR ESTIMATING A WIRELESS COMMUNICATION CHANNEL, DEVICE FOR ESTIMATING A WIRELESS COMMUNICATION CHANNEL AND COMPUTER PROGRAM THEREFOR

CROSS-REFERENCE TO RELATED APPLICATIONS

This Application is a Section 371 National Stage Application of International Application No. PCT/EP2019/077298, filed Oct. 9, 2019, the content of which is incorporated herein by reference in its entirety, and published as WO 2020/083641 on Apr. 30, 2020, not in English.

1. FIELD OF THE INVENTION

The field of the invention is that of wireless communication systems, in particular massively multi-antenna systems known as "Massive Multiple Input Multiple Output" (MIMO).

2. PRESENTATION OF THE PRIOR ART

The invention is placed in the context of the study of mobile networks, in particular those of the 5th generation (5G). The data rates envisaged for these so-called 5G networks are very high. To reach them, multi-antenna systems (MIMO) are promising, because their maximum theoretical throughput evolves proportionally to the number of antennas used, at a fixed transmission power.

However, reaching a maximum theoretical throughput can be problematic. This requires much more complex processing than for single-antenna systems. It is also preferable to know the transmission channel (also called communication channel) that separates the transmitter from the receiver. For this purpose, an estimate of the communication channel is made.

For a system with transmit and receive antennas $N_t N_r$, the MIMO channel estimate consists of determining a complex coefficient per frequency for each of the antenna pairs $N_r N_t$ in the system. In the case where $N_t$ and/or $N_r$ is very high (we speak then of a massive multi-antenna system: "Massive MIMO"), it is very expensive to estimate each coefficient independently.

It is then possible to use a physical model that allows to take into account the linkage relations between the coefficients and thus reduce the number of parameters to be estimated, and consequently the cost of the estimate. The physical models used in the state of the art assume that the receiver is far enough from the transmitter in relation to their respective sizes so that the spherical wavefronts are well approximated by planes: this is the "plane waves" assumption. This assumption is made by all estimate methods based on a physical model, see for example the seminal paper "Bajwa et al: *Compressed Channel Sensing: A New Approach to Estimating Sparse Multipath Channels*" Vol. 98, No. 6, June 2010.

Massively multi-antenna systems for 5th generation mobile networks are bound to have more and more antennas. The transmitters/receivers will in fact get larger and larger. This implies that the plane wave assumption will only be true for larger and larger distances.

This defeats the current estimate methods, especially in the case of very large antenna arrays and/or receivers close to the transmitter.

One of the objectives of the invention is to overcome these drawbacks of the prior art.

3. SUMMARY OF THE INVENTION

According to a first aspect of the invention, there is provided a method for estimating a wireless communication channel between a transmitter and a receiver, comprising a plurality of paths for propagation of a wave, at least either the transmitter or the receiver being formed of a plurality of antennas. According to a general feature of the invention, the method comprises:

for at least one path, a determination of a so-called characteristic matrix, which depends on a first element representative of at least one propagation direction associated with the path, and a second element representative of a propagation distance associated with said path, and an estimate of the communication channel from said at least one obtained characteristic matrix.

In other words, the inventors propose a new way to estimate a wireless communication channel, based on a so-called characteristic matrix that takes into account not only a propagation direction, but also a propagation distance. This characteristic matrix allows a better estimate of the communication channel, especially when the transmitter/receiver configuration (e.g. related to the size of the antennas and/or the distance between the transmitter and the receiver) does not allow to verify the plane wave hypothesis.

Preferably, according to one embodiment, the characteristic matrix associated with the path further depends on at least one of the following two elements:

at least one vector connecting the center of gravity of the transmitter antenna array and at least one transmitter antenna, at least one vector connecting the center of gravity of the receiver antenna array and at least one receiver antenna.

This embodiment allows to take into account all configurations of antenna arrays at transmission and reception, whatever the number of antennas and their positions in space.

According to an embodiment, the definition of a characteristic matrix depends on one of a plurality of channel models.

The characteristic matrix is thus adaptable to the chosen channel model, depending on the wave propagation assumption that is made.

According to an embodiment, the plurality of models may include the spherical wave model and a so-called parabolic wave model describing a distance between: the distance between the positions of at least one pair of antennas formed by an antenna of the transmitter and an antenna of the receiver on the one hand, and the distance existing between the centers of gravity of the antenna arrays of the receiver and the transmitter on the other hand, the so-called parabolic wave model being a function only:

of a quantity depending on at least one of the following elements:

a propagation start direction vector associated with the path, a propagation arrival direction vector associated with the path, and a corrective term depending on the propagation distance associated with this path, said magnitude and said corrective term corresponding respectively to said first and said second element, mentioned above.

The parabolic wave model has the advantage of allowing a better estimate of the channel when the plane wave hypothesis is no longer valid, but without the complexity associated with the spherical wave hypothesis, which is particularly costly in terms of computation time.

Preferably, according to a first alternative embodiment of the invention, the method further includes a prior step of validating the channel model on which the characteristic matrix depends, which comprises:

obtaining the distance between the centers of gravity of the antenna arrays of the receiver on the one hand and the transmitter on the other hand, a comparison of said distance to a first and second threshold, a validation of a plane wave model if the obtained distance is higher than the second threshold, of the so-called parabolic wave model if the obtained distance is between the first and the second threshold, and the spherical wave model if the obtained distance is lower than the first threshold This preliminary step makes it possible to validate the relevance of the chosen channel model for a channel estimate that will be carried out later, in particular for the considered transmitter/receiver context. Advantageously, the model validated during the preliminary step is optimal for the channel estimate to be performed.

Preferably:

the first threshold is a function of the distance to the 3/2 power between the center of the transmitter antenna array and the center of the transmitter antenna array, and the second threshold is a function of the squared distance between the center of the transmitter antenna furthest from the center of the transmitter antenna array and the center of the transmitter antenna array.

The choice of this first and second threshold is particularly simple to implement.

Preferably, according to a second alternative embodiment of the invention, the method further includes a prior step of validating the channel model on which the characteristic matrix depends, which comprises a determination of a relative model approximation error for at least a first and a second model, each relative model approximation error being a function of a deviation between a reference model and one of said two models a comparison of each relative model approximation error to a predetermined margin of error value, and a validation or not of the first channel model or the second channel model according to the result of the comparison.

This second alternative makes it possible to get rid of an arbitrary phase difference on which the first alternative presented above depends. It also allows to better take into account the relative positions and orientation of the transmitter and/or receiver antennas.

According to a first alternative embodiment of the invention, performing a communication channel estimate preferably comprises, at least for a first path:

A first estimate of a first propagation distance value associated with the first path, and a first propagation direction associated with the first path, and a determination of a first characteristic matrix dependent on said estimated first propagation distance value and said first propagation direction.

The advantage of this method of implementation is that it provides an accurate estimate of the channel.

Preferably, the first alternative may further comprise for a second path:

A second estimate of a second propagation distance value associated with said second path, and a second propagation direction associated with said second path, and a determination of a second characteristic matrix dependent on said estimated second propagation distance value and said second propagation direction, and a residual resulting from the first estimate.

Advantageously, this embodiment makes it possible to carry out a channel estimate in the case where several paths exist, via a sequence of simple estimates considering only one path (so-called "glutton" algorithm).

According to a second alternative of this embodiment of the invention, at least the first estimate or the second estimate can be performed in a first underestimate, for a first fixed quantity and a second quantity, distinct from the first quantity, which can take a plurality of predetermined values, then a second underestimate for the second quantity set to a value resulting from the first underestimate and the first value can take a plurality of predetermined values.

This second alternative proposes to perform the channel estimate in a sequential way. It is much less expensive in terms of computation time than the first alternative presented above.

For example:

the first size or the second size is one of the following:

an element representative of the propagation distance associated with the path considered, or an element representative of the propagation direction associated with the path considered.

Choosing as first magnitude an element representative of the direction is particularly advantageous in the case of a directive transmission. On the other hand, choosing an element representative of the propagation distance as the first quantity is simple to implement.

According to a second aspect of the invention, there is provided a method for precoding a signal to be transmitted via a communication channel, comprising:

an estimate of the communication channel according to any of the preceding claims in order to obtain an estimated communication channel, and a precoding of the signal to be transmitted according to the estimated communication channel.

Proper precoding maximizes the throughput of the communication. The more accurate the channel estimate, the better the precoding (taking into account the curvature of the wavefronts improves the accuracy of the channel estimate).

According to a third aspect of the invention, a method for demodulating a received signal after propagation via a communication channel is proposed, comprising:

an estimate of the communication channel obtained by one of the above described communication channel estimate methods to obtain an estimated communication channel, and a demodulation of the received signal according to the estimated communication channel.

Proper demodulation maximizes the throughput of the communication. The better the demodulation, the more accurate the channel estimate (taking into account the curvature of the wavefronts improves the accuracy of the channel estimate).

According to a fourth aspect of the invention, a method is proposed for determining a so-called parabolic wave model, in particular implemented by a computer, said parabolic wave model describing a deviation between: the distance between the positions of at least one pair of antennas formed by an antenna of the transmitter and an antenna of the receiver on the one hand, and the distance existing between the centers of gravity of the antenna arrays of the receiver and of the transmitter on the other hand, the so-called parabolic wave model being a function only:
of a quantity depending on at least one of the following elements:
a propagation start direction vector associated with the path,
a propagation arrival direction vector associated with the path,
and a corrective term depending on the propagation distance associated with this path.

The parabolic wave model has the advantage of allowing a better estimate of the channel when the plane wave hypothesis is no longer valid, but without the complexity associated with the spherical wave hypothesis, which is particularly costly in terms of computation time.

According to a fifth aspect of the invention, there is provided a method for estimating a wireless communication channel between a transmitter and a receiver, comprising a plurality of paths for propagation of a wave, at least one of the transmitter and the receiver being formed by a plurality of antennas. According to a general feature of this fifth aspect of the invention, the method comprises:

for at least one path, a determination of a so-called characteristic matrix, which depends on the parabolic wave model, and an estimate of the communication channel from said at least one characteristic matrix obtained. The characteristic matrix depending on the parabolic wave model allows a better estimate of the communication channel, especially when the transmitter/receiver configuration (e.g. related to the size of the antennas and/or the distance between the transmitter and the receiver) does not allow to verify the plane wave hypothesis.

According to a sixth aspect of the invention, there is provided a device for estimating a wireless communication channel between a transmitter and a receiver, comprising a plurality of paths allowing the propagation of a wave, at least the transmitter or the receiver being formed of several antennas. According to a general feature of this sixth aspect of the invention, the device comprises:

a determination means configured to implement, for at least one path, a determination of a so-called characteristic matrix, which depends on a first element representative of at least one propagation direction associated with the path, and a second element representative of a propagation distance associated with said path, and an embodiment configured to implement a realization of a communication channel estimate from said at least one obtained characteristic matrix.

Preferably, the characteristic matrix associated with the path further depends on at least one of the following two elements:
at least one vector connecting the center of gravity of the transmitter antenna array and at least one transmitter antenna,
at least one vector connecting the center of gravity of the receiver antenna array and at least one receiver antenna.

Preferably, the definition of a characteristic matrix depends on one of a plurality of channel models.

According to an embodiment, the plurality of models may include the spherical wave model and a so-called parabolic wave model describing a distance between: the distance between the positions of at least one pair of antennas formed by an antenna of the transmitter and an antenna of the receiver on the one hand, and the distance existing between the centers of gravity of the antenna arrays of the receiver and the transmitter on the other hand, the so-called parabolic wave model being a function only:
of a quantity depending on at least one of the following elements:
a propagation start direction vector associated with the path,
a propagation arrival direction vector associated with the path,
and a corrective term depending on the propagation distance associated with this path,
said magnitude and said corrective term corresponding to said first and said second element respectively.

According to a first alternative embodiment, the device may further include validation means configured to implement a prior validation step of the channel model on which the characteristic matrix depends, said validation means comprising obtaining means configured to implement an obtaining of the distance between the centers of gravity of the antenna arrays of the receiver on the one hand and the transmitter on the other hand, a comparison means configured to implement a comparison of said distance to a first and second threshold, a decision means configured to implement a validation of a plane wave model if the distance obtained is greater than the second threshold, of the so-called parabolic wave model if the distance obtained is between the first and the second threshold, and the spherical wave model if the distance obtained is less than the first threshold.

Preferably,
the first threshold is a function of the distance to the 3/2 power between the center of the transmitter antenna array and the center of the transmitter antenna array, and the second threshold is a function of the squared distance between the center of the transmitter antenna furthest from the center of the transmitter antenna array and the center of the transmitter antenna array.

According to a second embodiment, the device may further include a validation means configured to implement a prior validation step of the channel model on which the characteristic matrix depends, which comprises determination means configured to implement a determination of a relative model approximation error for at least a first and a second model, each relative model approximation error being a function of a deviation between a reference model and one of said two models comparison means configured to implement a comparison of each relative model approximation error to a predetermined error margin value, and a decision means configured to implement a validation or not of the first channel model or the second channel model depending on the result of the comparison.

According to an embodiment, said embodiment is configured to implement a performance of a communication channel estimate and comprises:

an estimating means configured to implement, for at least a first path, a first estimate of a first propagation distance value associated with the first path, and a first propagation direction associated with the first path, and a determination of a first characteristic matrix dependent on said estimated first propagation distance value and said first propagation direction.

Preferably, the device may further comprise:
a second estimating means configured to implement, for a second path, a second estimate of a second propagation distance value associated with said second path, and of a second propagation direction associated with said second path, and a determination of a second characteristic matrix depending on said estimated second propagation distance value and said second propagation direction, as well as on a residual resulting from the first estimate.

Preferably, at least the first estimating means or the second estimating means can be configured to perform a first underestimate, for a first fixed quantity and a second quantity, distinct from the first quantity, which can take a plurality of predetermined values, then a second underestimate for the second quantity set to a value resulting from the first underestimate and the first value can take a plurality of predetermined values.

Preferably, the first size or the second size is one of the following:

an element representative of the propagation distance associated with the path considered, or an element representative of the propagation direction associated with the path considered.

According to a seventh aspect of the invention, there is provided a system for precoding a signal to be transmitted via a communication channel, comprising:

a communication channel estimate device such as one of those described above, to obtain an estimated communication channel, said precoding system being configured to implement a precoding of the signal to be transmitted according to the estimated communication channel.

According to a sixth of the invention, there is proposed a system for demodulating a signal received after propagation via a communication channel, comprising:

a communication channel estimate device such as one of those described above to obtain an estimated communication channel, said demodulation system being configured to implement a demodulation of the received signal according to the estimated communication channel.

According to an eighth aspect of the invention, a device is proposed which is configured to determine a so-called parabolic wave pattern describing a deviation between: the distance between the positions of at least one pair of antennas formed by an antenna of the transmitter and an antenna of the receiver on the one hand, and the distance existing between the centers of gravity of the antenna arrays of the receiver and of the transmitter on the other hand, the so-called parabolic wave model being a function only:

of a quantity depending on at least one of the following elements:

a propagation start direction vector associated with the path, a propagation arrival direction vector associated with the path, and a corrective term depending on the propagation distance associated with this path.

According to a ninth aspect of the invention, there is provided an estimate system configured to estimate a wireless communication channel between a transmitter and a receiver, comprising a plurality of paths for propagation of a wave, at least one of the transmitter and the receiver being formed of a plurality of antennas. According to a general feature of this ninth aspect of the invention, the system comprises:

a determination means to determine for at least one path, a so-called characteristic matrix, which depends on the parabolic wave model described above, and an implementation means for performing a communication channel estimate from said at least one obtained characteristic matrix.

The characteristic matrix function of the parabolic wave model allows a better estimate of the communication channel, especially when the transmitter/receiver configuration (e.g. related to the size of the antennas and/or the distance between the transmitter and the receiver) does not allow to verify the plane wave hypothesis.

According to a tenth aspect of the invention, there is provided a computer program comprising instructions for implementing a method for estimating a communication channel as described above. This program can be executed by a processor.

According to an eleventh aspect of the invention, a computer program is proposed comprising instructions for implementing a method of precoding a signal to be transmitted via a communication channel as described above or a method of demodulating a signal received after propagation via a communication channel as described above. This program can be executed by a processor.

These programs can use any programming language. It can be downloaded from a communication network and/or saved on a computer-readable medium.

According to a twelfth aspect of the invention, a recording medium is proposed, readable by a processor, characterized in that it is capable of storing a computer program comprising instructions for implementing a method of precoding a signal to be transmitted via a communication channel as described above or a method of demodulating a signal received after propagation via a communication channel as described above. The recording medium is optionally removable, respectively storing a computer program implementing a channel estimate, or precoding or demodulation method as described above.

4. LIST OF FIGURES

Further advantages and features of the invention will become clearer upon reading the following description of a particular embodiment of the invention, given merely as an illustrative and non-limiting example, and the appended drawings, among which:

FIG. 1 schematically illustrates a system comprising a transmitter and receivers that may incorporate an embodiment of the invention;

FIGS. 7a and 7b represent embodiments of two alternatives of a preliminary step of validation of a wave model, according to the invention;

5. DESCRIPTION OF A PARTICULAR EMBODIMENT OF THE INVENTION

Figure 1:
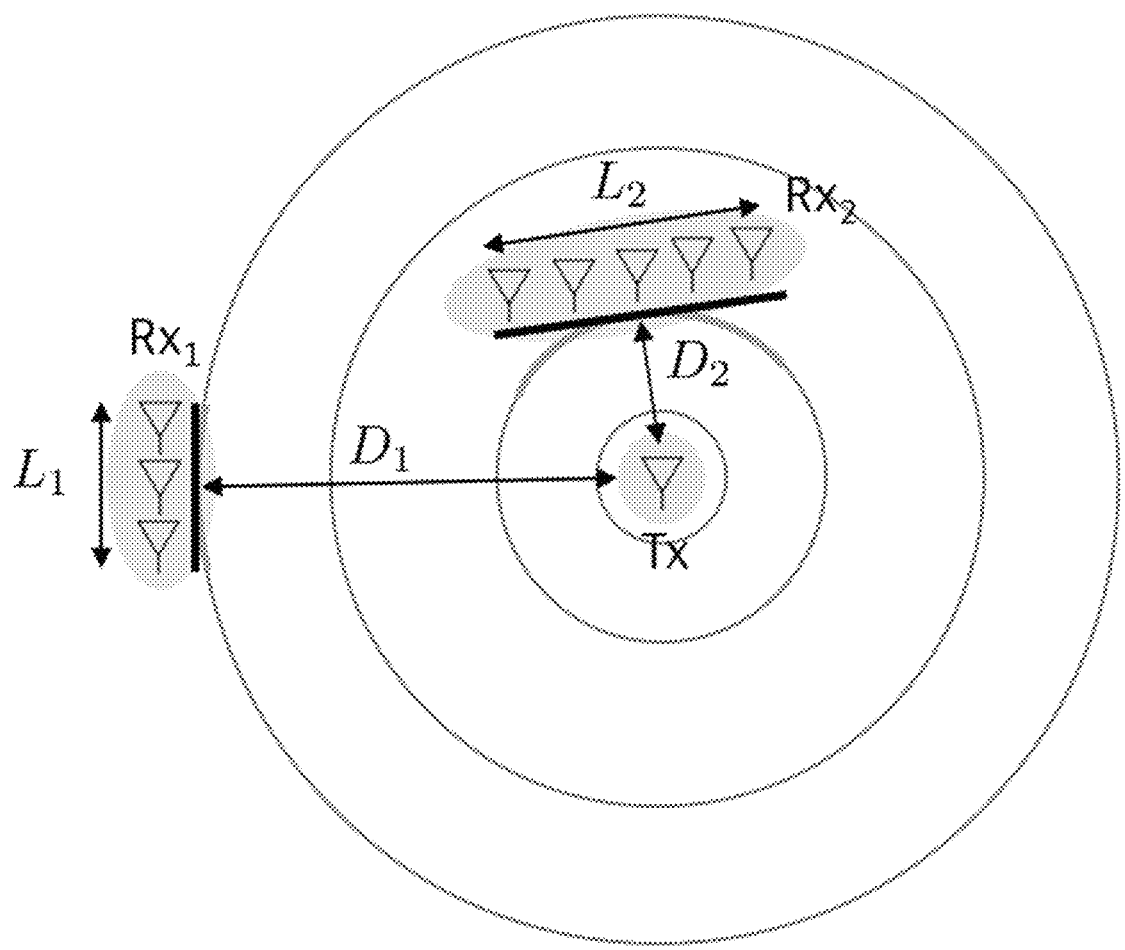

FIG. 1 illustrates an example of a communication system in which the invention is used. In this example, a transmitter Tx or a transceiver such as a base station, communicates with two receivers $Rx_1$ and $Rx_2$ (or transceivers) respectively formed by one or a plurality of antennas. A wireless communication channel comprising one or more paths (also called paths) connects the transmitter Tx to each of the receivers $Rx_1$ and $Rx_2$. The communication channel (or transmission channel) allows signals to be transmitted from the transmitter to each of the receivers, the receiver having access to the transmitted signal distorted by its passage through the channel, and to which thermal noise has possibly been added. It is known that each path constituting the channel is associated with a complex gain, defined by a phase shift and an attenuation.

The first receiver $Rx_1$ of dimension L1 (for example a characteristic length of the first receiver, or the diameter of a circle in which all the antennas of the first receiver are inscribed) is located at a distance $D_1$ from the transmitter Tx. This distance is large enough for the plane wave hypothesis to be applicable, despite the size of the receiver.

Conversely, the second receiver $Rx_2$ of dimension L2 is located at a distance $D_2$ from the transmitter Tx. The dimension L2 corresponds for example to the diameter of a circle in which a system of 256 antennas associated with each other is inscribed if we place ourselves in the case of a "massive MIMO" receiver. The length $D_2$ is insufficient to allow the application of the hypothesis plane waves. Indeed the curvature of the waves symbolized by the concentric circles, is too important from the point of view of the $Rx_2$ receiver.

Figure 2:
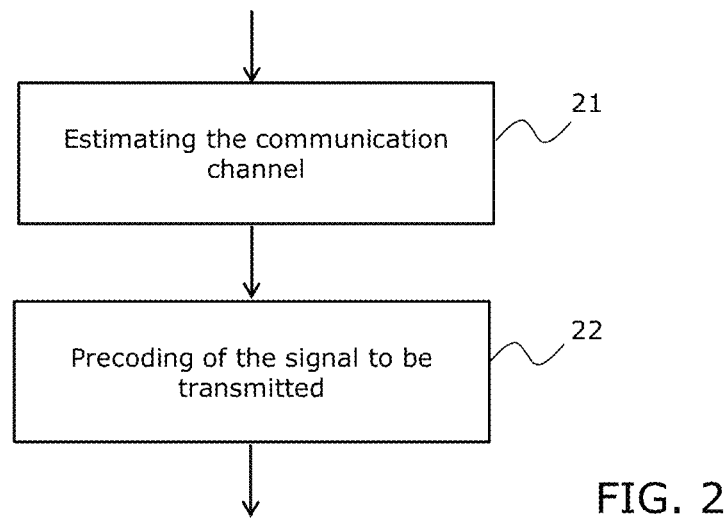
FIGS. 2 and 3 illustrate respectively precoding and demodulation methods implementing an embodiment according to the invention.

For a signal to be transmitted from a transmitter to a receiver, a precoding of the signal to be transmitted is performed to maximize the data rate on the wireless communication channel. As illustrated in FIG. 2, a first step 21 of estimating the wireless communication channel is performed, in order to know the parameters defining this communication channel. Then a precoding 22 of the signal to be transmitted via this communication channel is performed based on the parameters obtained during the communication channel estimate step.

Figure 3:
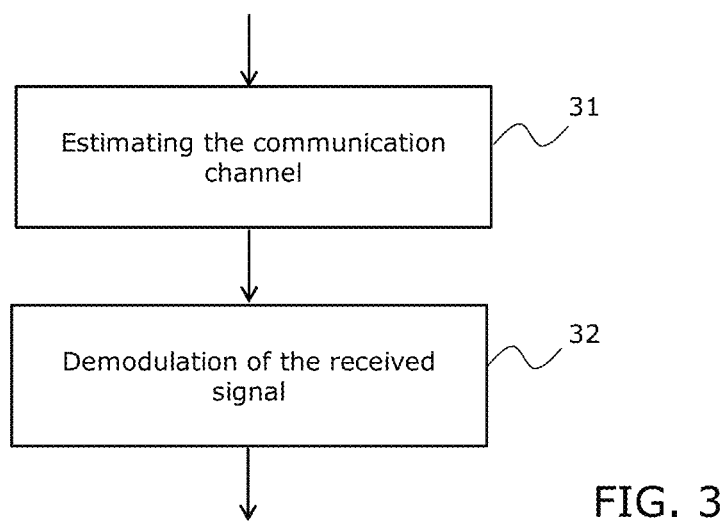

For a signal received by a receiver from a transmitter, a demodulation of the signal received via the communication channel is performed in order to maximize the data rate on the channel. As shown in FIG. 3, a first step 31 of estimating the wireless communication channel is performed, in order to know the parameters defining this communication channel, from known transmitted signals. Then a demodulation 32 of the received signal of the communication channel is performed from the estimated channel, or in other words from the parameters obtained in the step of estimating the communication channel.

Figure 4:
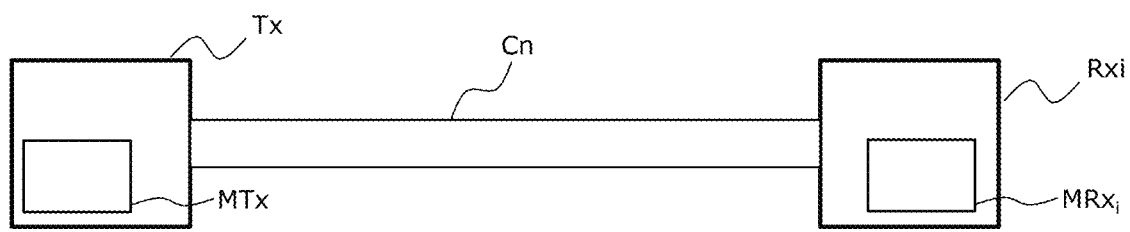
FIG. 4 illustrates more precisely and schematically a transmitter/receiver system that can implement an embodiment of the invention.

FIG. 4 illustrates very schematically a device implementing an embodiment of the invention. A transmitter Tx is connected to a receiver $Rx_i$ via a wireless communication channel Cn symbolized by a rectangle. The transmitter Tx comprises a processing means MTx configured, among other things, to implement the steps 21 and 22 described with reference to FIG. 2.

The receiver Tx comprises a processing means $MRx_i$ configured, among other things, to implement the steps 31 and 32 described with reference to FIG. 3.

Figure 5:
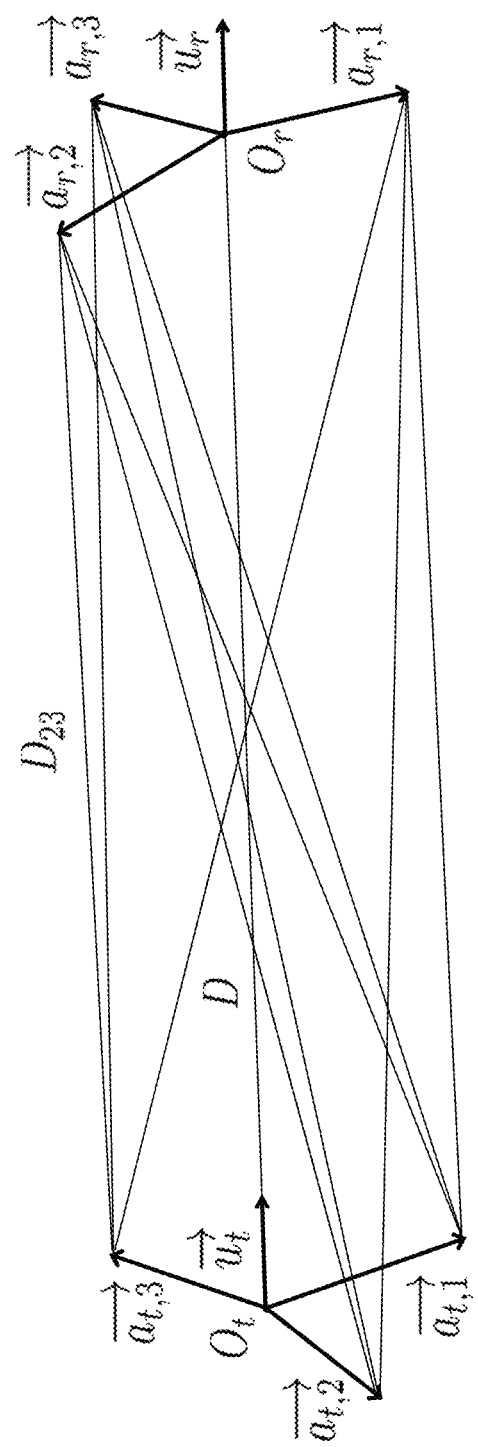
FIG. 5 illustrates, as an example, a general representation model of the communication system shown in FIG. 4.

FIG. 5 illustrates, as an example, a general model of representation of the communication system schematized on FIG. 4, in a case of a transmission in line of sight ("LoS"). A point $O_t$ (respectively $O_r$) corresponds to the center of gravity of the transmission (respectively reception) antenna array.

Vectors $\{\vec{a}_{t,1}, \ldots, a_{t,N_t}\}$ and $\{\vec{a}_{r,1}, \ldots, a_{r,N_r}\}$ correspond to the positions of the transmission and reception antennas with respect to their respective centers of gravity (different local benchmarks are used for transmission and reception). Moreover a reference distance D corresponds to the distance between the two centers of gravity $O_t$ and $O_r$.

The notation $D_{ij}$ refers to the distance between the j-th transmitting antenna and the i-th receiving antenna. In the example of FIG. 5, the distance $D_{23}$ between the second transmitter antenna and the third receiver antenna is shown. $\vec{u}_t$ corresponds to the direction of wave propagation at the start of the communication channel in the reference frame centered on $O_t$ and $\vec{u}_r$ to the direction of wave propagation at the end of the communication channel in the reference frame centered on $O_r$.

Assuming attenuation and phase proportional to the distance $O_{ij}$ traveled by the waves, the transmission channel at the frequency f between the J-th transmission antenna and the i-th reception antenna can be expressed as follows:

$$h_{ij} = h \frac{D}{D_{ij}} e^{-j\frac{2\pi}{\lambda}(D_{ij}-D)},$$

where $$\lambda \triangleq \frac{c}{f}$$

is the wavelength, c corresponding to the speed of light, and h corresponds to the channel between the points $O_t$ and $O_r$. Moreover, the distances D and $D_{ij}$ being rather close in practice, the hypothesis $$\frac{D}{D_{ij}} = 1$$

is made. Finally, the distance $D_{ij}$ is expressed as follows $$D_{ij} = \sqrt{D^2 + 2D(\vec{a_{r,i}} \cdot \vec{u_r} - \vec{a_{t,j}} \cdot \vec{u_t}) + \|R\vec{a_{r,i}} - \vec{a_{t,j}}\|^2},$$

where R is a rotation matrix allowing to match the local markers used at transmission and reception.

Considering this expression for the distance as accurate, the inventors were able to establish a new definition of the spherical wave model (SWM), as expressed below:

$$\Delta_{SWM,ij} \triangleq D_{ij} - D = \sqrt{D^2 + 2D(\vec{a_{r,i}} \cdot \vec{u_r} - \vec{a_{t,j}} \cdot \vec{u_t}) + \|R\vec{a_{r,i}} - \vec{a_{t,j}}\|_2^2} - D,$$

So we get for the channel expression:

$$h_{ij} = h e^{-j\frac{2\pi}{\lambda}\Delta_{SWM,ij}}.$$

Classically, due to the assumption of the plane wave model, the state-of-the-art physical models used for channel estimate approximate the expression $\Delta_{SWM,ij}$ by $$\Delta_{PWM,ij} = \vec{a}_{r,i} \cdot \vec{u}_r - \vec{a}_{t,j} \cdot \vec{u}_t$$

This expression is much less complex than the one used in the case of the spherical wave model assumption, but it poses the problem of lack of precision in the case of receivers and/or transmitters with large antennas.

To solve this problem of complexity (and therefore cost in terms of computing time) posed by the spherical wave model and inaccuracy posed by the plane wave model, the inventors have proposed a new intermediate wave model called Parabolic Wave Model (ParWM), as defined below:

$$\Delta_{ParWM,ij} = \vec{a}_{r,i} \cdot \vec{u}_r - \vec{a}_{t,j} \cdot \vec{u}_t + \frac{1}{2D}\left[\|R\vec{a}_{r,i} - \vec{a}_{t,j}\|^2 - (\vec{a}_{r,i} \cdot \vec{u}_r - \vec{a}_{t,j} \cdot \vec{u}_t)^2\right].$$

This new model is a compromise between the PWM plane wave model and the SWM spherical wave model: it is more accurate than the PWM, and less complex than the SWM. Indeed, the expression of $\Delta_{ParWM,ij}$ only includes products and additions while that of $\Delta_{SWM,ij}$ includes a square root.

In the remainder of the description, for simplification purposes, the invention will be placed in the particular context known as MISO (Multiple In Single Out) multipath, i.e., it is considered that the receiver comprises a single antenna. Of course, the person skilled in the art will easily be able to extend the invention to the MIMO context by considering the general expression of the distance difference $D_{ij}$ or one of its approximations proposed above.

In the MISO context, the receiver has only one antenna, $N_r=1$. As a result, the Rotation matrix R, a factor of the vector representing the direction of arrival of the signal on the receiver antennas, disappears from the equation. This corresponds for example to 5G networks designed for base stations with a large number of antennas and mobile terminals with only one antenna. In this case, the expressions given above allow to take into account not only communication channels consisting of a single path in direct view but also paths resulting from reflections on planes in indirect view. Each path is associated with a complex gain corresponding to the channel between the centers of gravity of the transmission and reception antenna arrays.

The inventors have proposed a general expression for the communication channel comprising paths p. This expression is valid for the three considered models SWM, PWM and ParWM:

$$h\mathcal{M} = \sqrt{N_t} \Sigma_{k=1}^p h_k e\mathcal{M}(\vec{u}_{t,k}, D_k),$$

where $\mathcal{M}$ denotes the chosen physical model, $h_k$, $\vec{u}_{t,k}$ and $D_k$ are respectively the transmission channel between the centers of gravity of the transmission and reception antenna arrays, the direction of departure during the propagation of the waves for the k-th path and the distance traveled by the waves for the k-th path, and $e\mathcal{M}(\vec{u}_{t,k}, D_k) \in \mathbb{C}^{N_t N_t}$ is a so-called characteristic vector of the physical model $\mathcal{M}$ for this k-th path. In case where the transmitter and the receiver each comprise several antennas, the communication channel is then defined by a characteristic matrix whose dimensions are given by the number of antennas at the transmitter and the receiver. In the example considered where the receiver has only one antenna, the characteristic matrix has only one column. We speak then of characteristic vector.

This characteristic vector is generally expressed as follows:

$$e_\mathcal{M}(\vec{u}_{t,k}, D_k) = \frac{1}{\sqrt{N_t}}\begin{pmatrix} e^{-j\frac{2\pi}{\lambda}\Delta_{\mathcal{M},1k}} \\ \vdots \\ e^{-j\frac{2\pi}{\lambda}\Delta_{\mathcal{M},N_t k}} \end{pmatrix}.$$

With for the spherical wave SWM and parabolic wave ParWM models:

$$\Delta_{SWM,jk} = \sqrt{D_k^2 + 2D_k(\vec{a}_{i,j}, \vec{u}_{t,k}) + \|\vec{a}_{i,j}\|_2^2} - D_k,$$

$$\Delta_{ParWM,jk} = -\vec{a}_{i,j} \cdot \vec{u}_{t,k} + \frac{1}{D_k}\left[\|\vec{a}_{i,j}\|^2 - (\vec{a}_{i,j}, \vec{u}_{t,k})^2\right].$$

In the case of the PWM plane wave model with $\Delta_{PWM,jk} = -\vec{a}_{t,j} \cdot \vec{u}_{t,k}$, the expression of the vector does not depend on the distance but only on the direction of departure, it is simply a directional vector ("steering vector") that can be noted $e_{PWM}(\vec{u}_{t,k})$. This model does not take into account the curvature of the wavefronts. On the contrary, the characteristic vectors of the spherical SWM and parabolic ParWM models depend on the distance and allow to take into account the curvature of the wavefront. It should be noted that a single general expression for the communication channel allows the use of all three models.

Figure 6:
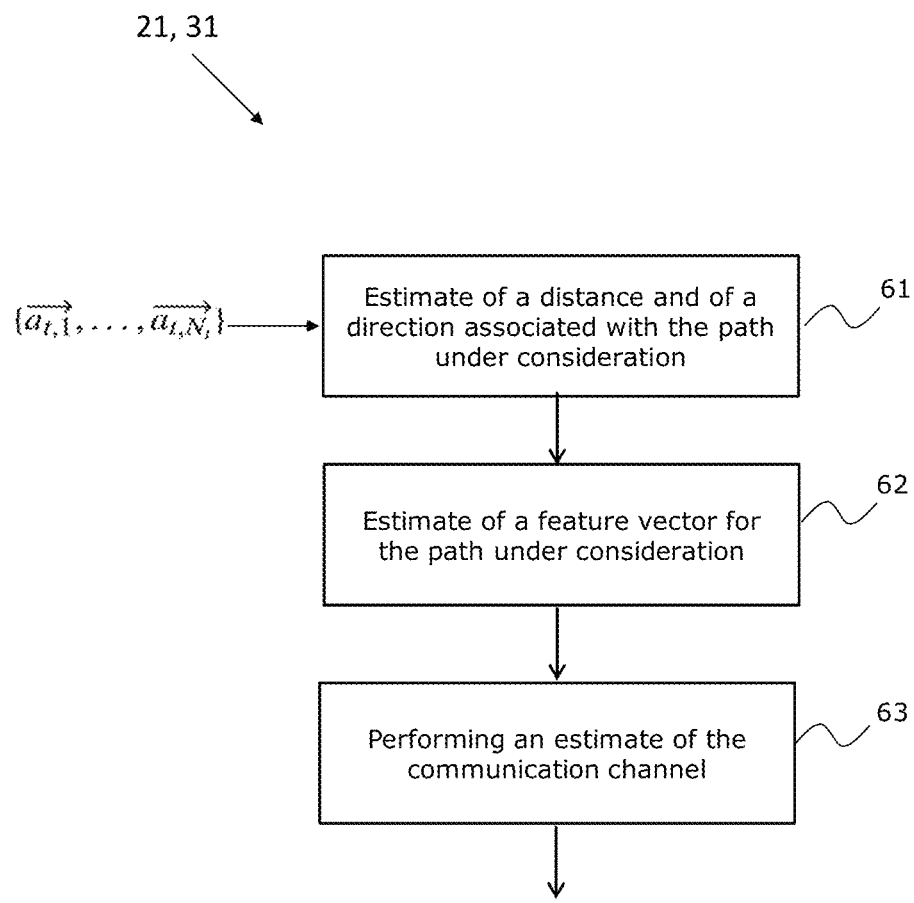
FIG. 6 shows a an embodiment of a method for estimating a communication channel estimate according to the invention.

In the case where it is preferable to take into account the radius of curvature of the wavefront, a method for estimating the communication channel is proposed (e.g., for steps 21 or 31 of FIG. 2 or 3), an embodiment of which is illustrated in FIG. 6.

A first step 61 includes, for one or more paths, an estimate of a value representative of the propagation distance associated with the path under consideration (or an estimate of a value allowing to infer it later).

For example, this distance can be equated to the distance between the center (or barycenter) of the transmitter and the center of the receiver.

Alternatively, this distance can be assimilated to the distance between an antenna of the transmitter and the antenna of the receiver.

This first step 61 also includes an estimate of the direction of departure of the wave $\vec{u}_{t,k}$ for the path(s) considered (or of a magnitude representative of said direction which can be inferred at a later stage). The vectors $\{\vec{a}_{t,1}, \ldots, \vec{a}_{t,N_t}\}$ may also be estimated during this step 61. Alternatively, these vectors can be provided by default as input to step 61.

A second step 62 comprises estimating a feature vector per path according to the invention, from the values estimated during step 61.

An embodiment of the communication channel estimate is then performed in a step 63 from the feature vectors determined in step 62.

According to one embodiment of the invention, it is particularly advantageous to perform a prior validation step of the channel model on which the feature vector depends. One purpose of this step is to confirm that the channel model used is indeed valid for the distance D separating the transmitter from the receiver.

A first example of a preliminary step is shown in FIG. 7a. A phase shift deviation of at most $$\frac{\pi}{8}$$

from the phase shift of the spherical wave mode $$\left|\frac{2\pi}{f}\Delta_{SWM,jk}\right|$$

is allowed to validate the plane wave model. If $$\frac{2\pi}{\lambda}|\Delta_{SWM,jk} - \Delta_{PWM,jk}| \text{ and } \frac{2\pi}{\lambda}|\Delta_{SWM,jk} - \Delta_{ParWM,jk}|$$

are bound, where $\Delta_{PWM,jk}$ and $\Delta_{ParWM,jk}$ are the phase shifts of the plane and parabolic wave models respectively, using the fact that $|\vec{a}_{t,j}\cdot\vec{u}_r| \leq R_t$, where $R_t \triangleq \max_i \|\vec{a}_{t,i}\|_2$, ($\|.\|_2$ denoting the classical Euclidean norm), we get:

$$D \geq \frac{8R_t^2}{\lambda}$$

for the plane wave model, this bound being defined as the Fraunhofer distance, $$D \geq \sqrt{\frac{8R_t^3}{\lambda}}$$

for the parabolic wave model, this bound can be defined as the Fresnel distance.

$R_t$ is the radius of the smallest circle in which the antenna array forming the transmitter fits.

As illustrated in FIG. 7a, a first step 71a comprises obtaining the distance D between the center of the transmitter and that of the receiver. Then comparing in a step 72a between said distance D and two thresholds $S_1$ and $S_2$ with for example $$S_1 = \sqrt{\frac{8R_t^3}{\lambda}} \text{ and } \frac{8R_t^2}{\lambda}.$$

Finally a validation step 73a of the use of the plane wave model if $$D \geq \frac{8R_t^2}{\lambda},$$

the parabolic wave model if $$\frac{8R_t^2}{\lambda} > D \geq \sqrt{\frac{8R_t^3}{\lambda}},$$

and the spherical wave model if $$D \geq \sqrt{\frac{8R_t^3}{\lambda}}.$$

This alternative is simple to implement, but it has the disadvantage of being based on an arbitrary phase difference of $$\frac{\pi}{8}.$$

Moreover it is independent or me position (once the distance is obtained) and the relative orientation of the receiver with respect to the transmitter.

Another alternative shown in FIG. 7b addresses these problems. This alternative relies on a metric called relative model approximation error (rMAE), defined below:

$$rMAE = \frac{\|h - proj_{\mathcal{M}}(h)\|_2^2}{\|h\|_2^2}$$

where $proj_{\mathcal{M}}(u) \triangleq \operatorname{argmin}_{x \in \mathcal{M}} \|u-x\|_2$ where $\mathcal{M}$ is the model to be validated and h is the reference channel, here the channel obtained with the spherical wave model. The relative approximation error of the model quantifies the minimum approximation error implied by the model M considered.

The model M can be considered valid when the rMAE is low (for example if rMAE<0.05, which corresponds to an error of at most 5%). For example if we consider a uniform linear array of 256 antennas for the transmitter at 30 GHz and a receiver facing the broadside of the transmitter, the parabolic wave model is valid (rMAE<0.05) if the distance D between the transmitter and the receiver is greater than 2.5 m.

More precisely, this alternative comprises a first step 71b where an approximation error rMAE is determined for a given model by considering a reference model REF, for example the spherical wave model. In a test 72b, the relative approximation error of the model is compared to a predetermined error margin value VP, for example 5%. If the relative approximation error of the model is less than 5%, then the given model is validated, step 73b. Otherwise, it is discarded as too inaccurate for the considered transmitter/receiver configuration, step 74b. It should be noted that the parabolic wave model described above becomes sufficiently accurate from only a few meters.

Using the linear structure of the relations between the transmitted signals and the channel coefficients, a realization of a channel estimate can be based on observations of the form:

$$y = Xh + n,$$

where h is the channel to be estimated, X is the observation matrix (which contains the pilot symbols used for channel estimate) and n represents the noise.

The problem in estimating the channel can be reformulated as follows:

$$\underset{E,\alpha}{\text{minimiser}} = \|y - XE\alpha\|_2^2, \hat{h} \leftarrow E\alpha,$$

where $E \triangleq (e\mathcal{M}(\vec{u}_{t,1}, D_1), \ldots, e\mathcal{M}(\vec{u}_{t,p}, D_p))$, and $\alpha \triangleq \sqrt{N_r}(h_1, \ldots, h_p)^T \hat{h}$ is the estimated channel.

According to an embodiment, a channel estimate realization is proposed using the characteristic vector defined above, this characteristic vector allowing a unified description of the three models: plane, parabolic and spherical waves. The algorithms considered here are called gluttonous, because the paths are estimated one by one, based on a residual from the estimate of the previous paths.

A first alternative comprises an estimate of a characteristic vector of the spherical or parabolic wave model by solving the following optimization problem when estimating the k-th path:

$$\vec{u}_{t,k}, D_k \leftarrow \underset{\vec{u}_t, D}{\text{argmax}} \frac{\|r^{(k)H} X e_{\mathcal{M}}(\vec{u}_t, D)\|}{\|X e_{\mathcal{M}}(\vec{u}_t, D)\|_2},$$

where $\mathcal{M}$ denotes the chosen model, $e\mathcal{M}(\vec{u}_t, D)$ the feature vector for the model and $\mathcal{M} r^{(k)}$ is a residual resulting from the previous iteration, such that:

$$r^{(1)} = y,$$

$$r^{(k+1)} = y - XE^{(k)}\alpha^{(k)},$$

with the optimal vector $\alpha^{(k)} \leftarrow (E^{(k)H}X^H XE^{(k)})^{-1} E^{(k)H} X^H y$ where $E^{(k)} \triangleq (e\mathcal{M}(\vec{u}_{t,1}, D_1), \ldots, e\mathcal{M}(\vec{u}_{t,k}, D_k))$ represents the state of the matrix E at the k-th iteration. It is specified that H is here the well-known symbol for transconjugation.

Figure 8:
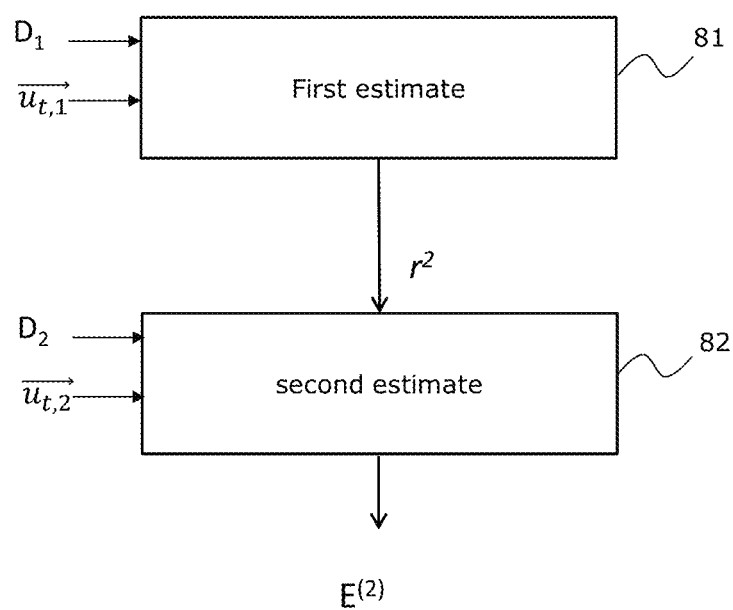
FIG. 8 illustrates an example of the implementation of the channel estimate step, shown in FIG. 6.

FIG. 8 illustrates an implementation of step 63 of FIG. 6, for example, in the case where two iterations are performed, respectively for a first and a second path. The extension to an implementation for k iterations can be easily deduced by the man of the art, from this example of FIG. 8.

A step 81 includes a first estimate for a first path from the determined values of the distance $D_1$ associated with the first path and the direction $\vec{u}_{t,1}$ also associated with the first path. A residual $r^{(2)}$ obtained as described above is output as input to a second step 82. This second step comprises a second estimate for a second path from the determined values of the distance $D_2$ associated with the second path, the direction $\vec{u}_{t,2}$ also associated with the second path and the residue $r^{(2)}$ obtained in step 81.

The matrix $E^{(2)}$ is delivered at the end of step 82, allowing to determine the estimated channel $\hat{h}$ from the previously mentioned equation: $\hat{h} \leftarrow E^{(2)} \alpha^{(2)}$ Note that in the case where only one path is considered, only step 81 is performed.

The advantage of this alternative is a high accuracy in the estimated channel obtained. However, the realization of the channel estimate is possible by building a dictionary of $$N_{\vec{u}_t} N_D$$

feature vectors (corresponding to starting $$N_{\vec{u}_t}$$

directions and $N_D$ distances). The complexity of the approximate solution of this problem is therefore $$O(N_{\vec{u}_t} N_D).$$

Indeed, this alternative implies to test all the distances for each direction, which induces a high computational complexity.

Another less expensive implementation is possible by estimating the characteristic vector of the chosen model (spherical or parabolic waves) via the solution of the optimization problem $$\vec{u}_{t,k} \leftarrow \underset{\vec{u}_t}{\text{argmax}} \frac{|r^{(k)H} X e_{PWM}(\vec{u}_t)|}{\|X e_{PWM}(\vec{u}_t)\|_2},$$

$$D_k \leftarrow \underset{D}{\text{argmax}} \frac{\|r^{(k)H} X e_{\mathcal{M}}(\vec{u}_{t,k}, D)\|}{\|X e_{\mathcal{M}}(\vec{u}_t, D)\|_2}.$$

This alternative implementation corresponds to a sequential estimate of the propagation directions respectively associated with each path, and then the distances also associated with each path. Its complexity is $$O(N_{\vec{u}_t} + N_D).$$

Indeed, the strategy amounts to testing several distances only for the best propagation direction. This best propagation direction can be determined for example with plane wave fronts.

Figure 9:
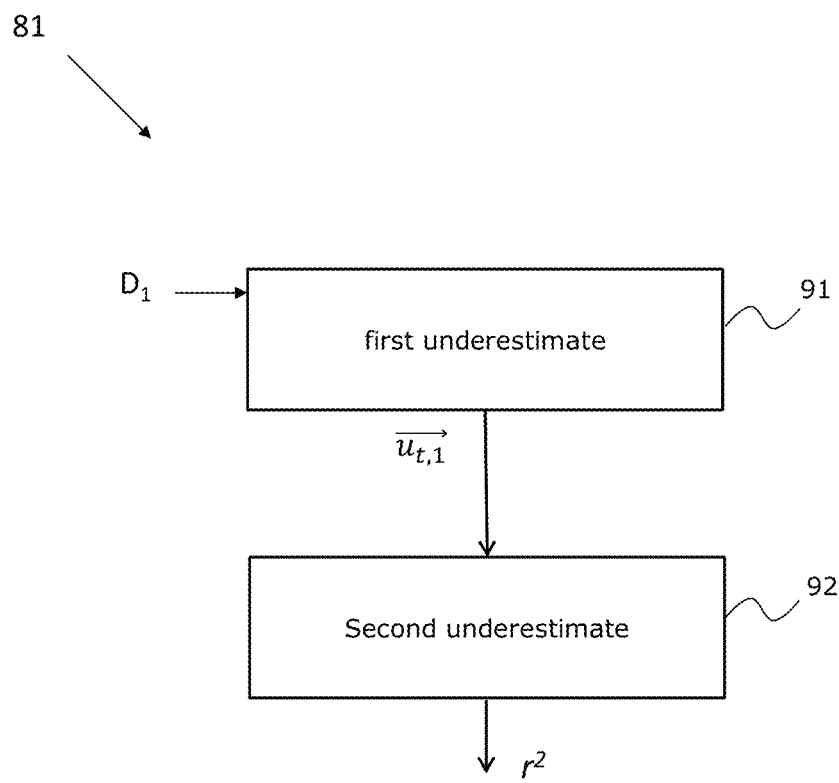
FIG. 9 illustrates another example of implementing the step of performing a channel estimate, shown in FIG. 6.

FIG. 9 illustrates an example of this alternative implementation, for example for the first estimate 81 in the previous figure. A first sub-estimate step 91 is to set the value of the distance $D_1$ and determine the best direction (the one that maximizes the cost function). When this best propagation direction is determined, a second underestimate 92 amounts to testing several distances for this best propagation direction. Conversely, in an alternative embodiment, the first underestimate may consist in finding the best possible distance value for a given propagation direction (for example in the case of a very directive propagation), then during the second underestimate step testing the propagation directions for this best distance value obtained during the first underestimate step.

Figure 10:
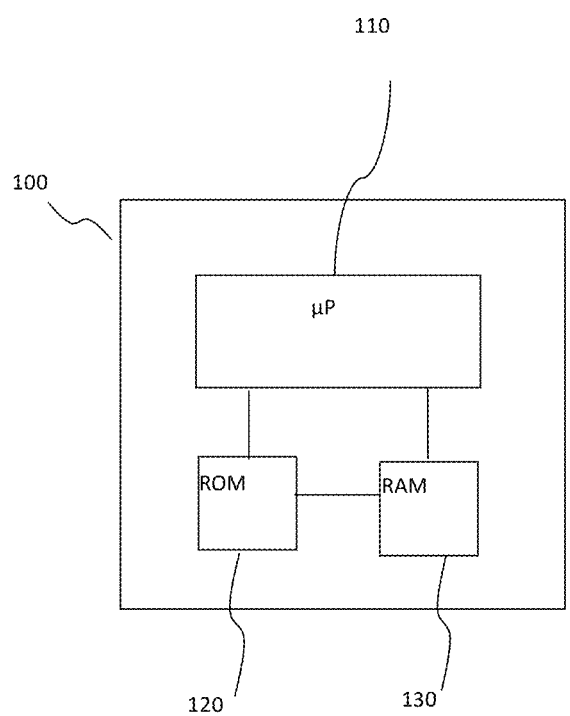
FIG. 10 illustrates a particular way of realizing a processing means for a transmitter or a receiver.

FIG. 10 illustrates one particular way, among several possible ways, to realize a processing means 100 (for a transmitter or receiver) configured to implement an embodiment of a method according to the invention. The device 100 comprises a random access memory 130 (e.g., a RAM memory), a processing unit 110 equipped with, for example, a processor, and driven by a computer program stored in a read-only memory 120 (e.g., a ROM memory or a hard disk). Upon initialization, code instructions of the computer program are for example loaded into the RAM 130 before being executed by the processor of the processing unit 110.

FIG. 10 illustrates only one particular way, among several possible ways, of realizing the processing means 100 so that it performs certain steps of the method according to the invention. Indeed, these steps can be performed indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In case where the processing means is realized with a reprogrammable computing machine, the corresponding program (i.e. the sequence of instructions) can be stored in a removable or non-removable storage medium, this storage medium being partially or totally readable by a computer or a processor.

It goes without saying that the implementation and realization methods described above are purely indicative and in no way limiting, and that numerous modifications can easily be made by the man of the art without going beyond the scope of the invention.

The invention claimed is:

1. A method performed by a device and comprising:
  estimating a wireless communication channel between a transmitter and a receiver, comprising a plurality of paths allowing propagation of a wave, at least the transmitter or the receiver being formed of several antennas, wherein the estimating comprises:
  for a first path, determining a first estimate of a first propagation distance value associated with the first path, and of a first propagation direction associated with the first path, and determining a first characteristic matrix,
  for a second path, determining a second estimate of a second propagation distance value associated with said second path, and of a second propagation direction associated with said second path, and determining a second characteristic matrix,
  the first and second characteristic matrices each having a definition depending on a parabolic wave model describing a distance between positions of at least one pair of antennas formed by an antenna array of the transmitter and an antenna array of the receiver, and a distance between centers of gravity of the antenna arrays of the receiver and the transmitter, the parabolic wave model being solely a function of:
    a quantity representative of the respective first or second estimate of the respective first or second propagation direction associated with the respective first or second path depending on at least one of the following elements:
      a propagation start direction vector associated with the respective first or second path, or
      a propagation arrival direction vector associated with the respective first or second path,
    and a corrective term depending on the respective first or second estimate of the respective first or second propagation distance value associated with the respective first or second path,
  and wherein at least one of the first estimate of the first propagation distance value and of the first propagation direction or the second estimate of the second propagation distance value and of the second propagation direction is carried out in a first underestimate, for a first quantity and a second quantity, distinct from the first quantity, wherein the first quantity is fixed and the second quantity can assume a plurality of predetermined values, and then in a second underestimate for the second quantity fixed at a value resulting from the first underestimate and the first quantity being able to assume the plurality of predetermined values, the first quantity or the second quantity being one of the following elements:
    the respective first or second estimate of the respective first or second propagation distance value associated with the respective first or second path, or
    the quantity representative of the respective first or second estimate of the respective first or second propagation direction associated with the respective first or second path, and
  generating an estimate of the communication channel from the first and second characteristic matrices obtained.

2. The method of claim 1, wherein each of the first and second characteristic matrices associated with the first and second paths further depends on at least one of the following two elements:
  at least one vector connecting the center of gravity of the transmitter antenna array and at least one transmitter antenna,
  at least one vector connecting the center of gravity of the receiver antenna array and at least one receiver antenna.

3. The method of claim 1, further comprising:
  precoding a signal to be transmitted via the communication channel according to the estimated communication channel.

4. The method of claim 1, further comprising:
  receiving a signal after propagation via the communication channel, and
  demodulating the received signal according to the estimate of the communication channel.

5. A device for estimating a wireless communication channel between a transmitter and a receiver, comprising a plurality of paths allowing propagation of a wave, at least the transmitter or the receiver being formed of several antennas, wherein the device comprises:
  a processor; and
  a non-transitory computer-readable medium comprising instructions stored thereon which when executed by the processor configure the device to:
  implement, for at least a first path, a first estimate of a first propagation distance value associated with the first path, and of a first propagation direction associated with the first path, and a determination of a first characteristic matrix,
  implement, for a second path, a second estimate of a second propagation distance value associated with said second path, and of a second propagation direction associated with said second path, and a determination of a second characteristic matrix,
  the first and second characteristic matrices each having a definition depending on a parabolic wave model describing a distance between positions of at least one pair of antennas formed by an antenna array of the transmitter and an antenna array of the receiver, and a distance between centers of gravity of the antenna arrays of the receiver and the transmitter, the parabolic wave model being solely a function of:
  a quantity representative of the respective first or second estimate of the respective first or second propagation direction associated with the respective first or second path depending on at least one of the following elements:
    a propagation start direction vector associated with the respective first or second path, or
    a propagation arrival direction vector associated with the respective first or second path,
  and a corrective term depending on the respective first or second estimate of the respective first or second propagation distance value associated with the respective first or second path,
wherein at least one of the first estimate of the first propagation distance value and of the first propagation direction or the second estimate of the second propagation distance value and of the second propagation direction is implemented by performing:
  a first underestimate, for a fixed quantity and a second quantity, distinct from the first quantity, wherein the first quantity is fixed and the second quantity can take a plurality of predetermined values, then
  a second underestimate for the second quantity set to a value resulting from the first underestimate and the first quantity can take the plurality of predetermined values,
  the first quantity or the second quantity being one of the following:
    the respective first or second estimate of the respective first or second propagation distance value associated with the respective first or second path, or
    the quantity representative of the respective first or second estimate of the respective first or second propagation direction associated with the respective first or second path,
  and generate and estimate of the communication channel from the obtained first and second characteristic matrices.

6. The device of claim 5, wherein each of the first and second characteristic matrices associated with the first and second paths further depends on at least one of the following two elements:
  at least one vector connecting the center of gravity of the transmitter antenna array and at least one transmitter antenna,
  at least one vector connecting the center of gravity of the antenna array of the receiver and at least one antenna of the receiver.

7. The device of claim 5, wherein the instructions further configure the device to:
  precode a signal to be transmitted via the communication channel according to the generated estimate of the communication channel.

8. The device of claim 5, wherein the instructions further configure the device to:
  receive a signal after propagation via the communication channel, and
  demodulate the received signal according to the estimate of the communication channel.

9. A non-transitory processor-readable recording medium, comprising instructions stored thereon which when executed by a processor of a device configure the device to estimate a wireless communication channel between a transmitter and a receiver, comprising a plurality of paths allowing propagation of a wave, at least the transmitter or the receiver being formed of several antennas, wherein the estimating comprises:
  for a first path, determining a first estimate of a first propagation distance value associated with the first path, and of a first propagation direction associated with the first path, and determining a first characteristic matrix,
  for a second path, determining a second estimate of a second propagation distance value associated with said second path, and of a second propagation direction associated with said second path, and determining a second characteristic matrix,
  the first and second characteristic matrices each having a definition depending on a parabolic wave model describing a distance between positions of at least one pair of antennas formed by an antenna array of the transmitter and an antenna array of the receiver, and a distance between centers of gravity of the antenna arrays of the receiver and the transmitter, the parabolic wave model being solely a function of:
    a quantity representative of the respective first or second estimate of the respective first or second propagation direction associated with the respective first or second path depending on at least one of the following elements:
      a propagation start direction vector associated with the respective first or second path, or
      a propagation arrival direction vector associated with the respective first or second path,
    and a corrective term depending on the respective first or second estimate of the respective first or second propagation distance value associated with the respective first or second path,
  and wherein at least one of the first estimate of the first propagation distance value and of the first propagation direction or the second estimate of the second propagation distance value and of the second propagation direction is carried out in a first underestimate, for a first quantity and a second quantity, distinct from the first quantity, wherein the first quantity is fixed and the second quantity can assume a plurality of predetermined values, and then in a second underestimate for the second quantity fixed at a value resulting from the first underestimate and the first quantity being able to assume the plurality of predetermined values, the first quantity or the second quantity being one of the following elements:
    the respective first or second estimate of the respective first or second propagation distance value associated with the respective first or second path, or
    the quantity representative of the respective first or second estimate of the respective first or second propagation direction associated with the respective first or second path, and
  generating an estimate of the communication channel from the first and second characteristic matrices obtained.

* * * * *